United States Patent Office 3,126,316
Patented Mar. 24, 1964

3,126,316
PROCESS OF INCREASING CHOLEPOIESIS WITH NICOTINIC ACID ESTER OF METHYL-p-TOLYL CARBINOL AND ALPHA-NAPHTHYL ACETIC ACID
Hugo Zellner, Linz (Danube), Austria, assignor to Danube-Pharmazie Gesellschaft m.b.H., Landwiedstr., Linz (Danube), Austria, a corporation of Austria
No Drawing. Filed Mar. 25, 1959, Ser. No. 801,732
Claims priority, application Austria Mar. 28, 1958
4 Claims. (Cl. 167—55)

The present application relates to a new and valuble water-soluble choleretic and cholepoietic compound and more particularly to a new ester of the choleretic and cholepoietic methyl-p-tolyl-carbinol, a component of the Malayan drug "Temoe lawak," to compositions containing such a new ester of methyl-p-tolyl carbinol, and to the use of such compositions in therapy.

It is known that the Indonesian drug Rhizoma curcumae javanicae, also called Radix curcumae xanthorrhizae, "yellow root," or "Temoe lawak," contains 3% to 5% of ethereal oils and, in addition thereto, 5% of the alcohol methyl-p-tolyl carbinol as well as the dye-stuff curcumin. The alcohol methyl-p-tolyl carbinol has a considerable choleretic effect. It is, however, very slightly soluble in water. As it has been assumed that this property prevents parenteral administration of the alcohol which was considered necessary for proper therapeutic use, attempts have been made to convert methyl-p-tolyl carbinol into a readily water-soluble form. For this purpose the water-soluble sodium salt of the mono-camphoric acid ester of methyl-p-tolyl carbinol has been prepared by esterifying the alcohol with camphoric acid anhydride and simultaneously forming the mono-sodium salt of the free carboxyl group of camphoric acid.

It has been found on further pharmacological investigation that the cholepoietic acivity of choleretic agents, i.e. the stimulating effect on excretion of bile by the liver is not so much dependent on their water solubility but on their ratio of distribution between the lipid phase and the aqueous phase. The more favorable said ratio is, the better is the cholepoietic effect. None of the known water-soluble derivatives of methyl-p-tolyl carbinol has a sufficiently favorable ratio of distribution between lipid phase and aqueous phase.

It is one object of the present invention to provide a new and valuable ester of methyl-p-tolyl carbinol which has an extremely favorable ratio of distribution between lipid phase and aqueous phase and, due thereto, a remarkable choleretic and cholepoietic activity, and which is of very low toxicity.

Another object of the present invention is to provide a simple and effective process of producing such a new and valuable ester of methyl-p-tolyl carbinol.

A further object of the present invention is to provide a pharmaceutical composition of high choleretic and cholepoietic activity which contains said new ester of methyl-p-tolyl carbinol.

Still another object of the present invention is to provide a process of stimulating excretion of bile by the liver.

Other objects of the present invention and advantageous features thereof will become apparent as the description proceeds.

In principle, the new ester of methyl-p-tolyl carbinol according to the present invention which is superior to other derivatives of said alcohol in its high cholepoietic activity and low toxicity is the nicotinic acid ester of methyl-p-tolyl carbinol. Said ester has a very favorable ratio of distribution between lipid phase and water phase. It increases excretion of bile by the liver and gall bladder very considerably. Its choleretic effect is enhanced by the nicotinic acid moiety of the ester which becomes effective after saponification. The new ester is of a very low toxicity. The $LD_{50}$ of the compound given perorally to white mice is about 6 g./kg.

The new ester has proved to be very well tolerated in clinical trials. No side-effects have been observed on administration of 1.1 g. of the nicotinic acid ester of methyl-p-tolyl carbinol. A considerable choleretic effect of the new ester could be observed for more than 45 minutes after administration. The amount of duodenal fluid excreted increased from 86% to 167% of the initial value within 45 minutes.

It is also possible to administer the new nicotinic acid ester of methyl-p-tolyl carbinol in combination with other choleretic agents, such as with α-naphthyl acetic acid. Such combination preparations have a surprisingly high choleretic effect.

The new ester according to the present invention is prepared by reacting methyl-p-tolyl carbinol with reactive derivatives of nicotinic acid. However, the conventional esterification methods using methyl-p-tolyl carbinol and nicotinic acid as starting materials and operating in the presence of acid catalysts and more particularly of hydrochloric acid, cannot be used because the methyl-p-tolyl carbinol is highly sensitive to acids. Said alcohol is very readily converted, for instance, by hydrochloric acid, at a temperature as low as 0° C. into the corresponding chloride. Heating of said chloride yields p-methyl styrene, whereby hydrochloric acid is split off.

Esterification by heating methyl-p-tolyl carbinol and nicotinic acid in the absence of a catalyst with or without the addition of solvents capable of removing the reaction water in the form of an azeotropic mixture also results in the formation of p-methyl styrene due to the splitting off of water on prolonged heating.

Likewise, the known process of producing nicotinic acid ester by reacting nicotinic acid with primary or, respectively, secondary alcohols at elevated temperatures under the influence of organic acids which contain boron in complex linkage is unsuitable for esterification of methyl-p-tolyl carbinol. For instance, on heating nicotinic acid with methyl-p-tolyl carbinol with the addition of boric acid or boric acid anhydride, water is also split off from said methyl-p-tolyl carbinol and p-methyl styrene is produced and not the desired nicotinic acid ester of methyl-p-tolyl carbinol.

According to an embodiment of the present invention, the new ester is produced by reesterification of a nicotinic acid ester of a readily volatile alcohol with methyl-p-tolyl carbinol. As this process also requires a prolonged reaction time, the yield is not very high due to the formation of polymer p-methyl styrene.

Far better yields are obtained when proceeding according to another embodiment of the present invention which consists in esterifying methyl-p-tolyl carbinol by means of the addition compound of nicotinic acid hydrochloride with a tertiary base such as pyridine, whereby an excess of said base can be used as solvent. Pyridine may, of course, be replaced by other bases of similar activity and preferably by other tertiary amines, for instance, dimethyl aniline. The resulting ester is isolated from the reaction mixture and is preferably purified by distillation in a vacuum.

The following examples serve to illustrate the present invention without, however, limiting the same thereto.

EXAMPLE 1

1360 g. of methyl-p-tolyl carbinol are heated to a temperature of 110–120° C. with 1150 g. of nicotinic acid methyl ester and 100 g. of pyridine in a glass flask provided with a fractionating column and a descending condenser, while stirring. Heating is discontinued as soon as about the theoretical amount of methanol (320 g.) has been distilled off. To remove the pyridine the reaction mixture is washed with water, dried over sodium sulfate and subjected to fractional vacuum distillation. A first running of unreacted nicotinic acid methyl ester is removed and is recycled for use in a new reaction batch. The following distillate is subjected to repeated fractional vacuum distillation and yields 1250 g. of the nicotinic acid ester of methyl-p-tolyl carbinol of the boiling point 166–168° C./2 mm. Hg. The distilled colorless oil solidifies on standing in the form of crystals.

EXAMPLE 2

1000 g. of nicotinic acid are reacted with an excess of thionyl chloride to yield nicotinic acid chloride hydrochloride. Excess tionyl chloride is distilled off first at atmospheric pressure and, at the end of the distillation, in a vacuum. The resulting nicotinic acid chloride hydrochloride is suspended in 3000 cc. of anhydrous chloroform while stirring. A mixture of 860 g. of methyl-p-tolyl carbinol and 1350 g. of pyridine is added drop by drop to the suspension. After the addition is completed, the mixture is heated under reflux in a water bath for 2 hours and is then allowed to stand overnight. Chloroform is distilled off and 1000 cc. of water are added to the distillation residue. Excess nicotinic acid is filtered off by suction and the filter residue as well as the filtrate are extracted with ether. Extraction is repeated three times. The ethereal extracts are combined and are washed, first with water, then twice with sodium bicarbonate solution, and finally again with water. After distilling off the ether, the nicotinic acid ester of methyl-p-tolyl carbinol is distilled in a vacuum. 1410 g. of an almost colorless oil distilling at 166–168° C./2 mm. Hg are obtained. The resulting oil crystallizes on standing. The specific gravity of the oil is 1.10287/25° C. The yield, when proceeding according to this process, is 92%, calculated for methyl-p-tolyl carbinol used as starting material.

The new nicotinic acid ester of methyl-p-tolyl carbinol is substantially insoluble in water. It can be administered in the form of an aqueous emulsion. To produce such an aqueous emulsion, the ester is molten in a water bath at a temperature of 50° C. 5 cc. of the molten ester are then emulsified in 95 cc. of water containing 0.1 g. of an emulsifier sold under the trademark "Veegum" which is a montmorillonite subjected to a special treatment. 1 cc. of the resulting emulsion contains 55 mg. of the nicotinic acid ester of methyl-p-tolyl carbinol.

Clinical tests were carried out with the above mentioned emulsion of the nicotinic acid ester of methyl-p-tolyl carbinol which was administered by means of a duodenal sound. The ester according to the present invention was compared with the sodium salt of α-naphthyl acetic acid a 20% aqueous solution of which was also administered by means of a duodenal sound. Furthermore, a mixture of said aqueous solution of the sodium salt of α-naphthyl acetic acid ester and of the nicotinic acid ester of methyl-p-tolyl carbinol was also used for comparison. The tolerance of both α-naphthyl acetic acid and of the new ester according to the present invention is very good. 42 persons which received up to three times daily 2 dragees each containing 75 mg. of the sodium salt α-naphthyl acetic acid and 37.5 mg. of the nicotinic acid ester of methyl-p-tolyl carbinol did not show any side-effects, even after administration for 3 to 4 weeks.

The following Table I shows the surprising choleretic effect of the new ester when administered by means of the duodenal sound.

Column 3 indicates the amount of biliary secretion in cc. before administration of the choleretic agent, while column 4 shows said amount after its administration. Column 5 represents the increase in excretion in percent. Column 6 gives the approximate duration of the choleretic effect in minutes.

Table I

| Compound and Dose | Patients tested | Excreted amount | | Increase of excreted amount in percent of the initial value | Duration of the choleretic effect in min. |
|---|---|---|---|---|---|
| | | Before administration, cc. | After administration, cc. | | |
| 2 g. of α-naphthyl acetic acid. | 21 | 56.3 | 92.9 | 61 | 60 |
| 1.1 g. of the nicotinic acid ester of methyl-p-tolyl carbinol | 8 | 53.3 | 98.9 | 86 | 45 |
| 1 g. of α-naphthyl acetic acid ester and 0.5 g. of the nicotinic acid ester of methyl-p-tolyl carbinol | 7 | 61.8 | 102.5 | 66 | 55 |

It is evident that the nicotinic acid ester of methyl-p-tolyl carbinol has the same effect as about twice the amount of α-naphthyl acetic acid while a combination of these two agents in the proportion of 2 parts of α-naphthyl acetic acid to 1 part of the nicotine acid ester of methyl-p-tolyl carbinol exhibits approximately the same choleretic activity with only about half the amount of the ester. It may be mentioned that administration of 1 g. of α-naphthyl acetic acid, i.e. about the same amount as the nicotinic acid ester, has a choleretic activity of short duration only thus proving that the nicotinic acid ester of methyl-p-tolyl carbinol is a highly effective agent. The following Table II confirms these results. In said table there are given the amount of bile excretion in cc. before and after administration and its increase, in percent, over the initial value as well as the bilirubin content of the bile before and after administration and its increase, in percent, over the initial value.

Table II

| Compound and dose | Patients tested | Amount of bile excretion in cc. | | Increase in percent of initial value |
|---|---|---|---|---|
| | | Before administration | After administration | |
| 2 g. of α-naphthyl acetic acid | 3 | 18.8 | 65.6 | 249 |
| 1.1 g. of the nicotinic acid ester of methyl-p-tolyl carbinol | 4 | 51.7 | 113.6 | 119 |
| 1 g. of α-naphthyl acetic acid ester and 0.5 g. of the nicotinic acid ester of methyl-p-tolyl carbinol | 2 | 34 | 113.5 | 235 |

| Compound and dose | Bilirubin content in mg. | | Increase in percent of initial value |
|---|---|---|---|
| | Before administration | After administration | |
| 2 g. of α-naphthyl acetic acid | 1.98 | 11.62 | 486 |
| .1 g. of the nicotinic acid ester of methyl-p-tolyl carbinol | 6.47 | 10.0 | 54 |
| 1 g. of α-naphthyl acetic acid ester and 0.5 g. of nicotinic acid ester of methyl-p-tolyl carbinol | 7.95 | 34.14 | 329 |

This test shows that not only the total amount of bile excreted but also the total amount of bilirubin excreted is increased by the administration of the nicotinic acid ester of methyl-p-tolyl carbinol as well as α-naphthyl acetic acid and of a combination of both compounds.

The following Table III shows that the increase in bile excretion as well as the increase in bilirubin content of the bile is not solely due to a stimulation of the gall bladder because even after operative removal of the gall bladder such an increase in bile excretion as well as in bilirubin content of the bile can be detected.

*Table III*

| Compound and dose | Patients tested | Amount of bile excretion in cc. | | Increase in percent of initial value |
|---|---|---|---|---|
| | | Before administration | After administration | |
| 2 g. of α-naphthyl acetic acid. 1.1 g. of the nicotinic acid ester of methyl-p-tolyl carbinol | 3 | 55.3 | 66.6 | 20 |
| | 2 | 69 | 186 | 167 |
| 1 g. of α-naphthyl acetic acid ester and 0.5 g. of the nicotinic acid ester of methyl-p-tolyl carbinol | 2 | 34 | 113.5 | 235 |

| Compound and dose | Bilirubin content in mg. | | Increase in percent of initial value |
|---|---|---|---|
| | Before administration | After administration | |
| 2 g. of α-naphthyl acetic acid | 1.41 | 1.91 | 35 |
| 1.1 g. of the nicotinic acid ester of methyl-p-tolyl carbinol | 8.16 | 8.43 | 3.3 |
| 1 g. of α-naphthyl acetic acid ester and 0.5 g. of the nicotinic acid ester of methyl-p-tolyl carbinol | 7.95 | 34.14 | 329 |

It may be mentioned that the sodium salt of dehydrocholic acid, i.e., a frequently used choleretic agent, does not shown any appreciable increase in bilirubin content in contrast to the bilirubin-increasing effect of the nicotinic acid ester of methyl-p-tolyl carbinol, of α-naphthyl acetic acid, and of their combination.

The new agent is preferably administered orally in the solid state in the form of tablets, dragees, pills, powders, capsules, or the like preparations or also in the form of solutions, emulsions, suspensions, and other liquid preparations.

Preferably, the ester is not used in its original form but diluted by suitable pharmaceutical excipients, thus allowing better and more economical use to be made thereof. In the case of powders a fine dispersion of the active compound in the pharmaceutical excipient is of importance. Such a fine dispersion can be achieved, for instance, by intimately mixing or milling the compound in a ball mill with a solid, pulverulent extending agent to the desired degree of fineness or by impregnating the already milled, finely powdered, solid carrier with a mixture of the active compound in water or in any other suitable solvent and removing the water or solvent.

When preparing tablets, dragees, pills, and the like shaped preparations to be used in human therapy, commonly employed diluting agents, binders, lubricants, and other tableting adjuvants are used, such as sugar, lactoise, talc, starch, bolus alba; as binders pectin, gelatin, gum arabic, methyl cellulose, yeast extract, agar, tragacanth; and as lubricants stearic acid, magnesium stearate, and others.

The content of the active compound in such preparations may vary. It is, of course, necessary that the compound be present in such an amount that a suitable dosage will be ensured. Ordinarily the preparation should not contain less than 2% of the active compound. The preferred amount of the active compound is between about 3% and about 20% of the preparation. Tablets containing, for instance, between about 20 mg. and about 500 mg. of the nicotinic acid ester of methyl-p-tolyl carbinol and preferably about 75 mg. per tablet have proved to be especially suitable in human therapy. When using the nicotinic acid ester of methyl-p-tolyl carbinol together with the sodium salt of α-naphthyl acetic acid, the amount of said nicotinic acid ester may be reduced by 50%. Dragees containing about 75 mg. of the sodium salt of α-naphthyl acetic acid and about 37.5 mg. of the nicotinic acid ester of methyl-p-tolyl carbinol have proved to be especially suitable. Ordinarily one to three times daily two such dragees were administered for the treatment of diseases of the biliary tract, such as cholelithiasis, cholangitis, cholecystopathy, chronic cholecystitis, acute cholecystitis, and others. The attacks of pain, painfulness, and sensitiveness to pressure at the right epigastric region, nausea, vomiting, and other disorders caused by or accompanying such diseases are readily eliminated by the administration of the nicotinic acid ester of methyl-p-tolyl carbinol or of its combination with α-naphthyl acetic acid, even in cases where the conventional treatment did not produce any improvement.

The following examples of compositions containing the new choleretic and cholepoietic agent serve to illustrate the present invention, without, however, limiting the same thereto.

EXAMPLE 3

75 mg. of the nicotinic acid ester of methyl-p-tolyl carbinol, 5 mg. of finely divided silica, sold under the trademark "Aerosil," 3 mg. of magnesium stearate, 76 mg. of lactose, and 66 mg. of starch are intimately mixed. The resulting mixture is pressed into kernels weighing 220 mg. which are coated with a layer of sugar in order to obtain dragees weighing 0.5 g.

EXAMPLE 4

75 mg. of the nicotinic acid ester of methyl-p-tolyl carbinol, 3 mg. of magnesium stearate, 6 mg. of cocoa butter, 4 mg. of gum arabic, 20 mg. of glucose, 95 mg. of lactose, and 17 mg. of starch are compounded in the usual manner, granulated, and pressed into tablets weighing 220 mg.

EXAMPLE 5

25 mg. of the nicotinic acid ester of methyl-p-tolyl carbinol are mixed with 25 mg. of beeswax, 5 mg. of lecithin, 120 mg. of hydrogenated sperm oil, and 200 mg. of peanut oil to yield a flowable paste. The paste is filled into gelatin capsules by means of a filling device.

EXAMPLE 6

75 mg. of α-naphthyl acetic acid, 37.5 mg. of the nicotinic acid ester of methyl-p-tolyl carbinol, 5 mg. of finely divided silica sold under the trademark "Aerosil," 4 mg. of magnesium stearate, 76 mg. of lactose, and 66 mg. of starch are intimately mixed. The resulting mixture is pressed into kernels weighing 263.5 mg. which are coated with a layer of sugar in order to obtain dragees weighing 0.5 g.

Of course, many changes and variations in the process of producing the nicotinic acid ester of methyl-p-tolyl carbinol, in the esterification conditions, temperature and duration, in the solvents used, in the methods of working up and purifying the resulting ester, in the compounding of said ester with pharmaceutical excipients, in the composition of therapeutically useful preparations containing said ester, in the mode of administration of such preparations, in the dosages employed, and the like may be made by those skilled in the art in accordance with the principles set forth herein and in the claims annexed hereto.

I claim:

1. A choleretic and cholepoietic composition comprising a pharmaceutical excipient and, as choleretic and cholepoietic agent, the nicotinic acid ester of methyl-p-tolyl carbinol and a compound selected from the group consisting of α-naphthyl acetic acid and its sodium salt.

2. A composition as claimed in claim 1, in which 2 parts by weight of the α-naphthyl acetic acid compound are used for one part by weight of the nicotinic acid ester of methyl-p-tolyl carbinol.

3. The process of causing increased cholepoiesis, said process consisting in administering to patients between about 37.5 mg. and about 750 mg. daily of the nicotinic acid ester of methyl-p-tolyl carbinol.

4. The process of causing increased cholepoiesis, said process consisting in administering to patients between about 37.5 mg. and about 1500 mg., calculated for α-naphthyl acetic acid, of a compound selected from the group consisting of α-naphthyl acetic acid and its sodium salt and between about 20 mg. and about 375 mg. of the nicotinic acid ester of methyl-p-tolyl carbinol.

References Cited in the file of this patent

UNITED STATES PATENTS

| | | |
|---|---|---|
| 1,433,308 | Steffens | Oct. 24, 1922 |
| 1,775,636 | Bogin et al. | Sept. 16, 1930 |
| 2,759,945 | Anderson | Aug. 21, 1956 |
| 2,863,873 | Ekenstam et al. | Dec. 9, 1958 |

FOREIGN PATENTS

| | | |
|---|---|---|
| 1,001,267 | Germany | Jan. 24, 1957 |

OTHER REFERENCES

MacArdle: "Use of Solvents in Synthetic Org. Chem." (Van Nostrand), pp. 105–111 (1925).

Kohlstaedt: Die Pharmazie, Heft 12, 2, pp. 529–536, Jahragang, Berlin, December 1947.

Karrer: "Organic Chemistry" (4th Eng. Ed., Elsevier), p. 87 (1950).

Gunter: J. of Pharm and Exptl. Therap., vol. 99, No. 4, August 1950, pp. 465–477.

Hitzenberger: Wiener Medizinische Wochenschrift, June 6, 1958, vol. 108, No. 23, pp. 504–507.